J. R. BROWN.
RAIL BOND.
APPLICATION FILED NOV. 9, 1918.
1,376,396.  Patented May 3, 1921.
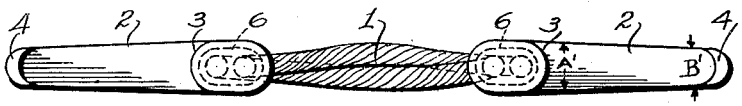
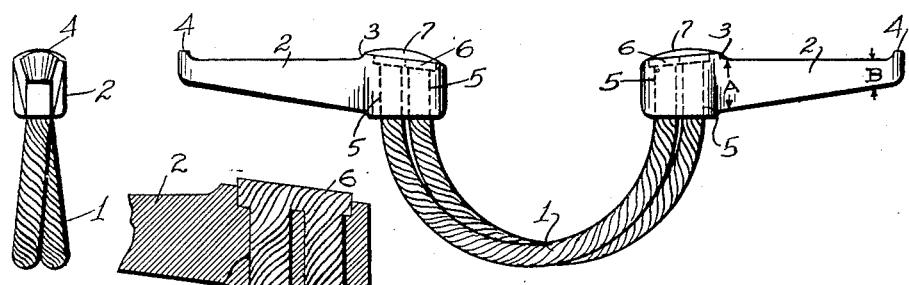
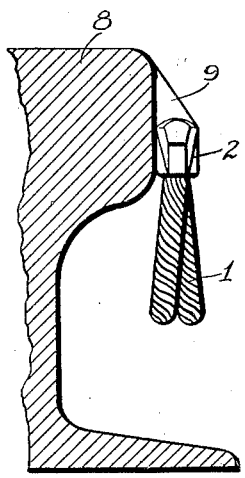
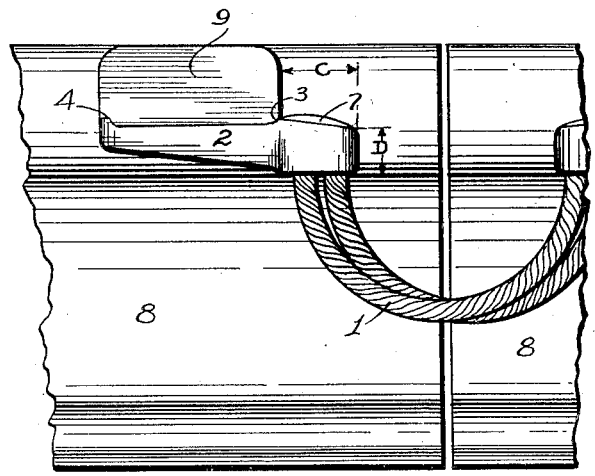
Inventor
John R. Brown
Witness
S. S. Matthis
By
Attorney

UNITED STATES PATENT OFFICE.

JOHN R. BROWN, OF MANSFIELD, OHIO, ASSIGNOR TO THE OHIO BRASS COMPANY, OF MANSFIELD, OHIO, A CORPORATION OF NEW JERSEY.

RAIL-BOND.

1,376,396.    Specification of Letters Patent.    Patented May 3, 1921.

Application filed November 9, 1918. Serial No. 261,834.

*To all whom it may concern:*

Be it known that I, JOHN R. BROWN, a citizen of the United States, residing at Mansfield, in the county of Richland and State of Ohio, have invented certain new and useful Improvements in Rail-Bonds, of which the following is a specification.

This invention relates to a device for electrically connecting the adjacent ends of rails used for conducting electric current and which device is commonly known in the trade as a rail bond.

The primary object of my device is to electrically unite the adjacent ends of track rails or other conductors when used as conductors for electric current.

Another object is to produce a device as economically as possible from the standpoint of materials and labor to the benefit of the manufacturer and user.

Another object is to make the bond highly efficient electrically and mechanically for the purpose intended.

Still another object is to construct a bond which is adapted to be attached to the rail by welding, which is conceded to be more desirable and efficient than other methods, such as compressing, expanding, soft soldering, etc.; and to weld to the rail by using a high strength material and one which is also economical in cost.

A further object is to provide means to indicate to the user the limits of the welding area.

A still further object is to construct the cross-sectional area of the terminal members of my bond such that they will bear a certain definite relation to other parts of the bond for securing the results desirable in a device of this class and when applied under the conditions hereinafter disclosed.

Other objects will be in part obvious from the annexed drawing and in part indicated in connection therewith by the following analysis of this invention.

This invention accordingly consists in the features of construction, combination of parts, and in the unique relations of the members and in the relative proportioning and disposition thereof; all as more completely outlined herein.

The views accompanying this description in the annexed drawing are as follows:—

Figure 1 is a side elevation view.

Fig. 2 is an end elevation view.

Fig. 3 is a top plan view.

Fig. 4 is a side elevation view of my bond showing the location on, and manner of attachment to a rail.

Fig. 5 is an end view of Fig. 4.

Fig. 6 shows a section of the terminal with the body member secured therein prior to the uniting of the body end to the terminal member.

My bond consists of body member 1 of copper which has high electrical conductivity and hence is efficient and at the same time economical for the purpose. To each end of the body 1 is secured a terminal member 2 which I prefer to make of practically pure iron and I have found Armco iron to give the best results on account of its high commercial purity and other properties such as high electrical conductivity and resistance to corrosion as compared with ordinary or commercial iron, although other grades of ferrous metals and also ferrous alloys may be used with satisfactory results; also Monel metal. The advantage of these metals is more clearly set forth hereinafter. Iron used in making the terminals has a resistance to electric current ranging from approximately seven times that of copper to thirteen times that of copper, depending on the purity.

My preferred form of terminal consists of a fabricated bar of commercially pure iron having a greater cross sectional area at a point adjacent the point of attachment of the body to the terminal than it possesses at points remote therefrom, as the current density is much higher at the point indicated by A, than at the end of the terminal away from the body and indicated by B. I have found a terminal member shaped as shown in Figs. 1, 2 and 3 to give excellent results and in which the terminal is higher and wider respectively at A and $A^1$ than at B and $B^1$.

My method of attaching the bond to the rail consists in general in applying an attaching metal to the terminal and rail and to do this and secure the greatest maximum strength of attachment and reduced cost, I employ iron or steel as the attaching metal 9. This metal is applied to the positioned and adjacent surfaces of the bond terminal and rail by means of the electric arc or oxy-acteylene flame, both of which having a high temperature of approximately 6400° F. will cause the adjacent surfaces of the bond terminal and rail and also the attaching metal in the form of a rod or bar, to melt and thoroughly unite together and form an integral union of the bond to the rail. I prefer to use a commercially pure iron as the attaching metal 9 and have found Armco iron to give most satisfactory results.

I have found, however, that in applying my bond or any other bond by the use of the oxy-acetylene flame or the electric arc, and in which iron or steel is the attaching metal, that the iron or steel will not unite with the copper of the bond body 1 but forms more of a mechanical joint which is spongy, very non-homogeneous and made up of globules of copper and iron and which has a very high resistance and cannot be relied upon for this class of work. Therefore, I propose to stop the application of the attaching metal to the terminal before it reaches the exposed end 7 of the copper body 1 at the upper face of the terminal, and to indicate to the operator where to stop the welding operation I provide a raised shoulder 3 at that point. At the opposite end of the terminal I provide a raised rim 4 which keeps the molten metal first applied to the terminal from running off. The shoulder 4 also gives the bond a neater appearance at the terminal end when finally installed.

To secure the bond body 1 and terminal members together I provide a passage 5 through the terminal member which may consist of a single or a double passage as shown. The upper end of the passage is enlarged to form a recess 6. The ends of the body 1 are inserted in the passages 5 and permitted to extend beyond the face of the terminal and the end of the body 1 is then forced into the enlarged recess 6 and caused to fill the recess and to allow a portion to remain above the surface of the terminal member 2. This enlargement of the end of the body permits of a greater area of contact between the body and the terminal. As the attaching metal 9 is not extended over the end of the bond at the point indicated by C, the end of the body 1 which is the main conducting member will not be connected to the rail in a very efficient manner as in other types of bonds adapted only to the use of a bronze or copper attaching metal and whereby the bond body is securely connected to the rail; therefore, I cause the exposed ends of the wire strand making up the bond body 1 to be melted together by means of the oxy-acetylene flame or electric arc and at the same time bring the heat on the iron terminal surrounding the bond body sufficiently high for the molten copper to unite with the terminal, thereby forming a head 7 having an integral union between the body and terminal of high conductivity. In the operation of uniting the body and terminal I may add other metal to that of the copper body, such as copper or bronze. This operation of uniting the body and terminal I prefer to do at the place of fabrication of the bond but it can be done by the workman at the time he installs the bond.

It will be noted that the height of the terminal at D is less than at a point adjacent the section A and this is for the same reason that there exists a difference between points A and B. The point of greatest current density when the bond has been installed will be at the point A where the attaching metal stops and hence the cross-section of the terminal at this point should be greatest.

In Figs. 4 and 5 my bond is shown attached to adjacent rail ends.

It is thus seen that the present invention provides a simple and practical device which is reliable and efficient in use and at all times and in short, one adapted to accomplish, among other things, all the objects and advantages above set forth.

In practice, I do not intend to confine myself to the details of construction herein illustrated and described, as the various parts of the device can be modified without departing from the spirit and principle of my invention, the scope of which is set forth in the appended claims.

I claim:

1. A rail bond comprising in combination a body member and an elongated terminal member welded together, the end of the body being welded to an exterior face of the terminal, the body member secured to the terminal member at one end thereof and the terminal member tapered from the union of the body and terminal member to the end of the terminal member for the purpose described.

2. A rail bond comprising in combination a body member and an elongated terminal member secured together, the terminal member having its greatest cross-section at a point adjacent the union of the body and terminal members and having a surface to support and retain an attaching metal used to secure the bond to a rail, as described.

3. A rail bond comprising in combination a body member and an elongated terminal member secured together, the terminal member having one point of greatest cross-section intermediate its ends and tapering in both directions from the point of greatest cross-section toward both ends as described.

4. A rail bond comprising in combination a body member and an elongated terminal member secured together, the terminal member having a point of greatest cross-section intermediate its ends and the terminal member reducing in cross-section in both directions therefrom.

5. A rail bond comprising in combination a body member and an elongated terminal member secured together, the terminal member having a point of greatest cross-section intermediate its ends and the terminal member reducing in cross-section toward one end.

6. A rail bond comprising in combination a body member and an elongated terminal member secured together and adapted to be welded to a rail by attaching metal secured to the adjacent surfaces of the rail and a portion of the length of the terminal member and means on the terminal to indicate the limits of welding surface thereon.

7. A rail bond adapted to be welded to a rail comprising in combination a body member and a terminal member, the body member secured to the terminal member by welding exterior of the terminal member, the terminal provided with a shelf member increasing in cross-section from one end to a point adjacent the point of union between the body and terminal and means on the terminal indicating approximately the point of greatest cross-section.

8. A rail bond having in combination a body member and a terminal member, the terminal provided with a sleeve portion having a passage to receive the end of the body member, means uniting the body and terminal member together, and means projecting from the sleeve portion to catch, support and retain fused metal used to attach the bond to a rail, the projecting means having its greatest cross section adjacent the sleeve.

9. A rail bond terminal provided with a portion having a passage therethrough to receive a conductor, means projecting from the above portion to catch, support and retain fused metal to secure the terminal to a rail, the projecting means having its greatest cross section adjacent the sleeve.

10. A rail bond terminal provided with a portion having a passage therethrough to receive a conductor, the passage comprising two chambers, one chamber being larger than the other to receive means for securing the conductor in place, and means projecting from the above portion to catch, support and retain fused metal to secure the terminal to a rail, the projecting means having its greatest cross section adjacent the sleeve.

In testimony whereof I affix my signature.

JOHN R. BROWN.